United States Patent
Pinder et al.

(10) Patent No.: US 7,555,123 B2
(45) Date of Patent: Jun. 30, 2009

(54) PROCESSING AN MPEG ELEMENTARY STREAM IN A CONDITIONAL ACCESS OVERLAY ENVIRONMENT

(75) Inventors: Howard G. Pinder, Norcross, GA (US); Jeffrey C. Hopper, Decatur, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 863 days.

(21) Appl. No.: 10/908,169

(22) Filed: Apr. 29, 2005

(65) Prior Publication Data

US 2006/0245589 A1    Nov. 2, 2006

(51) Int. Cl.
*H04N 7/167* (2006.01)
*H04L 9/00* (2006.01)

(52) U.S. Cl. .......... 380/202; 713/153; 713/154; 713/160; 713/163; 713/182; 726/1; 726/2; 726/3; 726/11; 726/13; 380/217; 380/241

(58) Field of Classification Search .......... 380/202; 713/160
See application file for complete search history.

(56) References Cited

U.S. PATENT DOCUMENTS

| | | | |
|---|---|---|---|
| 2002/0196939 A1* | 12/2002 | Unger et al. | 380/216 |
| 2003/0021412 A1* | 1/2003 | Candelore et al. | 380/217 |
| 2003/0026423 A1* | 2/2003 | Unger et al. | 380/217 |
| 2003/0081776 A1* | 5/2003 | Candelore | 380/200 |
| 2006/0262926 A1* | 11/2006 | Candelore et al. | 380/200 |
| 2006/0269060 A1* | 11/2006 | Candelore et al. | 380/239 |

* cited by examiner

*Primary Examiner*—Kambiz Zand
*Assistant Examiner*—Jenise E Jackson
(74) *Attorney, Agent, or Firm*—Merchant & Gould

(57) ABSTRACT

Processing an MPEG elementary stream contained in multiple PID streams in a conditional access overlay environment. A multi-program transport stream contains numerous video and audio elementary streams. Critical packets in the elementary streams are encrypted with two different encryption schemes creating a stream having multiple PID values. The streams are then sent from the headend to individual set-top boxes. One encryption scheme can be decoded by the incumbent set-top box and the second encryption scheme can be decoded by the overlay set-top box. The overlay set-top box uses a dual filter system to filter and decode the PIDs for each video and audio stream of the desired program.

14 Claims, 4 Drawing Sheets

PROCESSING AN MPEG ELEMENTARY STREAM IN A CONDITIONAL ACCESS OVERLAY ENVIRONMENT

TECHNICAL FIELD

The present invention relates to conditional access systems used to control availability of programming in content delivery systems and, more particularly, relates to providing partial dual encryption to permit different proprietary set-tops to be utilized in a single cable television system.

BACKGROUND OF THE INVENTION

The control of content is important in order to protect programming from, for example, nonpaying customers. A conventional communications system, such as a cable television system, therefore, typically applies an encryption scheme to digital television content in order to prevent unrestricted access. Once a system operator chooses an encryption scheme, the operator installs all of the necessary headend equipment (e.g., Scientific-Atlanta's conditional access software and associated equipment). The receiving devices (e.g., set-tops) located at the subscriber's premises must be compatible with the encryption scheme in order to decrypt the content for viewing. Due to the (at least partial) proprietary nature of conditional access systems, however, an operator is prevented from installing different set-tops that do not have the proper decryption keys and decryption algorithms. If the operator wishes to install different set-tops that decrypt a different conditional access system, the operator would also have to install a second proprietary encryption system to overlay the incumbent encryption system in order to use both set-tops.

It would be to the operator's advantage to be able to select set-tops from any manufacturer and easily implement different encryption/decryption schemes in the system without totally duplicating the headend equipment and utilizing substantially extra bandwidth. For example, a portion, but not all, of the data required for full presentation of a television program is encrypted according to one encryption scheme and then the same portion of data is encrypted again according to a second encryption scheme. The first encryption scheme corresponds to the legacy or incumbent set-top and the second encryption scheme corresponds to the non-legacy or overlay set-top. The remaining data is transmitted unduplicated in the clear to minimize the bandwidth impact.

Unique integer values commonly referred to as packet IDs (PIDs) are used to associate packets carrying elementary streams of a program in a single or multiple program transport stream. Known implementations of partial dual encryption involve duplicating only certain packets in a transport stream tagged with a certain PID. An additional or secondary PID is then mapped to each duplicated component to distinguish between duplicated content. Various known methods such as time slicing, $M^{TH}$ & N packet encryption, data structure encryption, or system information (SI) encryption are used to select the portions of the information as critical packets to be encrypted. Critical packets are packets selected for encryption based upon their importance to the proper decoding of the program content. For example, in MPEG content streams, critical packets are preferably packets containing higher-level headers such as picture headers, GOP headers, etc. Also, various encryption methods such as those found in Power-KEY®, from Scientific-Atlanta, Inc., may be utilized to encrypt the portions once selected while leaving other portions in the clear. However, original PIDs, commonly referred to as legacy or primary PIDs, continue to tag the packets encrypted with the legacy encryption as well as the other packets sent in the clear. By using primary and secondary PIDs, the decoder located in a set-top box can determine which packets are to be decrypted using the encryption method associated with that particular set-top box. In other words, regardless of the manner in which packets are selected for encryption and the encryption used, PID mapping or manipulation techniques are used to distinguish between multiple encryptions. For example, the legacy set-top decrypts the packets tagged with the primary PIDs and the overlay set-top decrypts the packets tagged with the secondary PIDs. The legacy set-top ignores the encrypted packets with the secondary PIDs and the overlay set-top ignores the encrypted packets with the primary PIDs. Set-tops, whether legacy or overlay, can determine which portions of the transport stream are transmitted and received in the clear. Once identified, the packets transmitted in the clear pass through the descramblers unaffected.

In particular, prior-art set-top boxes send each stream through a PID remapper, a PID filter, and then to a video decoder. The present invention, however, eliminates the need for a PID remapper. The overlay set-top box uses a dual filter system (FIG. 4) for each video or audio stream and then sends the output to the video or audio decoder. Advantageously, this is an improvement that reduces the cost and the complexity of the conditional access overlay system.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

A clear multi-program transport stream (MPTS) is provided to a headend facility. The clear MPTS includes several streams of unencrypted programs each including video, audio, and data packets. The packets each have a packet identifier (PID) to associate packets of elementary streams of the MPTS. Typically, an encryption scheme encrypts some or all of the packets (herein referred to as critical packets) of some or all of the programs depending upon the level of desired security.

However, if the operator wishes to install different set-tops that decrypt a different conditional access system, the operator would also have to install a second proprietary encryption system to overlay the incumbent encryption system in order to use both set-tops. As explained above, PID mapping techniques are known to distinguish between multiple encryptions.

Figure 1:
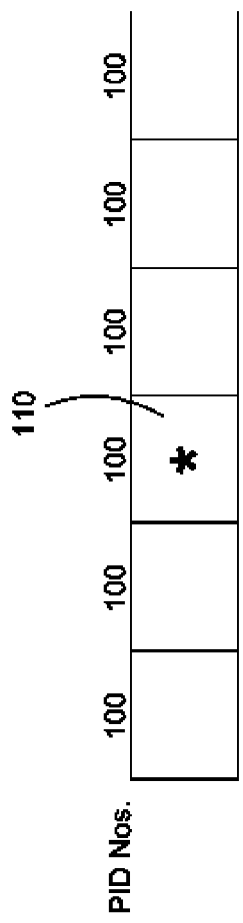
FIG. 1 illustrates a program including a critical packet.
Figure 2:
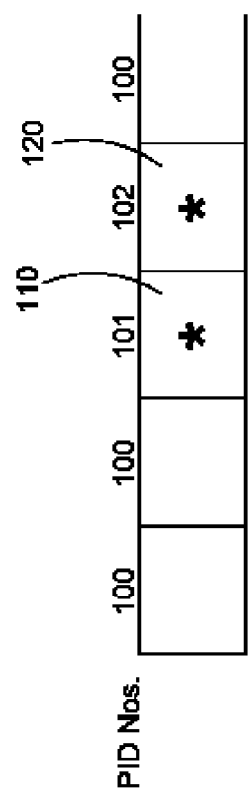
FIG. 2 illustrates the program and critical packet of FIG. 1 where the critical packet has been duplicated and remapped according to the prior art.

As taught in the prior art, a clear stream is provided to a critical packet identifier, duplicator, and remapper device (IDR). The identifier device identifies the critical packets in a program. FIG. 1 is an illustration of a stream of associated packets each having a PID 100. One of the associated packets in the stream is identified as a critical packet 110. The predetermined critical packet 110 is identified from the stream and duplicated. FIG. 2 is an illustration of the critical packet 110 and the resulting duplicated packet 120. The IDR remaps the two critical packets 110, 120 to have differing PID values. For example, as shown in FIG. 2, if the PID has an original value of 100, the IDR may remap the critical packet 110 to have a PID value of 101 and remap the duplicated packet 120 to have a PID value of 102. Now the duplicate packets 110, 120 have PID values that are distinguishable from one another as well as distinguishable from the PID values of the other packets in the stream.

One scrambler is then programmed to detect the PID values of the critical packets having the remapped PID 101 and scramble them with a first encryption scheme A. A second scrambler then detects the duplicated packets having the remapped PID value 102 and scrambles them according to a second encryption scheme B. The transport stream including the two encryption streams A and B and the clear stream C are subsequently provided to a PID remapper. The PID remapper then remaps the clear stream C to have the same PID value as the first encryption stream (e.g., PID 100 to PID 101). The transported stream may then include, for example, a percentage, such as 98%, of the clear stream C and a percentage, such as 2%, of both of the encrypted streams A and B. In this manner, an incumbent set-top, which is designed to decrypt encryption scheme A, receives 98% of the clear stream and 2% of the encrypted stream A. The remaining 2% of the encrypted stream B is simply not processed and discarded.

The present invention allows for two different decryption devices (e.g., a legacy, incumbent, or first set-top and a non-legacy, non-incumbent, overlay, or second set-top) to be located in a single system having an incumbent encryption scheme A and a second encryption scheme B. Each set-top is designed to decrypt the first or second proprietary encryption schemes.

In particular, the incumbent set-top box sends each stream through a PID remapper, a PID filter, and then to a video decoder. The present invention, however, eliminates the need for a PID remapper. The overlay set-top box uses a dual filter system (FIG. 4) for each video or audio stream and then sends the output to the video or audio decoder. Advantageously, this is an improvement that reduces the cost and the complexity of the conditional access overlay system.

Figure 3A:
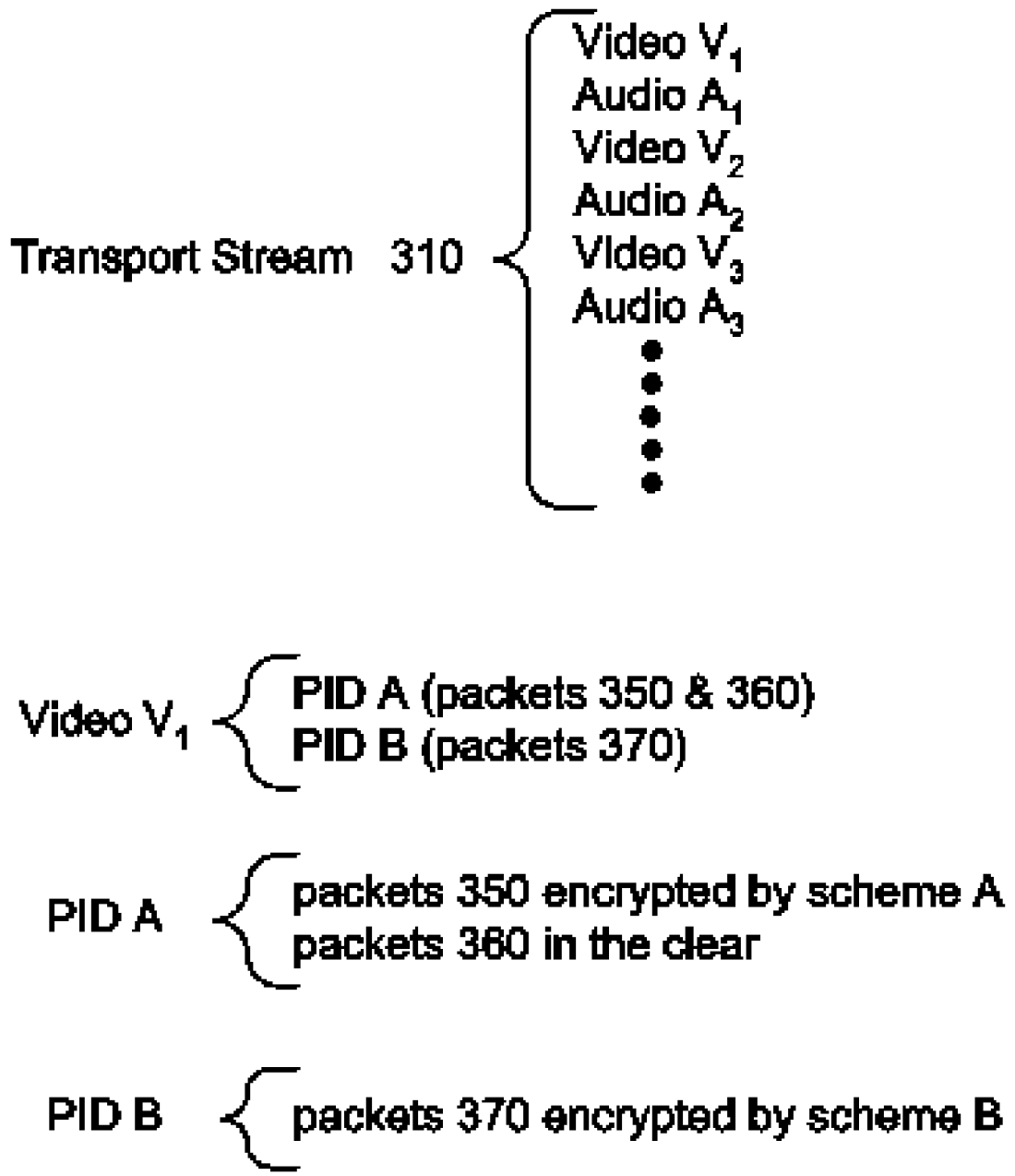
FIG. 3A illustrates the components of a transport stream.

FIG. 3A illustrates a multi-program transport stream 310 that would be sent from the headend. The multi-program transport stream 310 contains numerous video streams ($V_1$, $V_2$, $V_3$, etc.) and audio streams ($A_1$, $A_2$, $A_3$, etc.). For example, video $V_1$ is an elementary video stream of packets 350, 360, 370 with multiple PID values, PID A and PID B. Packets 350 and 360 have PID A. Packets 370 have PID B. The packets 350 having PID A are encrypted with encryption scheme A (the incumbent encryption scheme) and packets 360 having PID A are in the clear. Packets 370 having PID B are encrypted with encryption scheme B (the overlay encryption scheme). Each of the other audio ($A_1$, $A_2$, $A_3$, etc.) and video ($V_2$, $V_3$, etc.) elementary streams of the transport stream 310, also contain a combination of packets in the clear and encrypted according to scheme A and other packets encrypted according to scheme B.

Figure 3B:
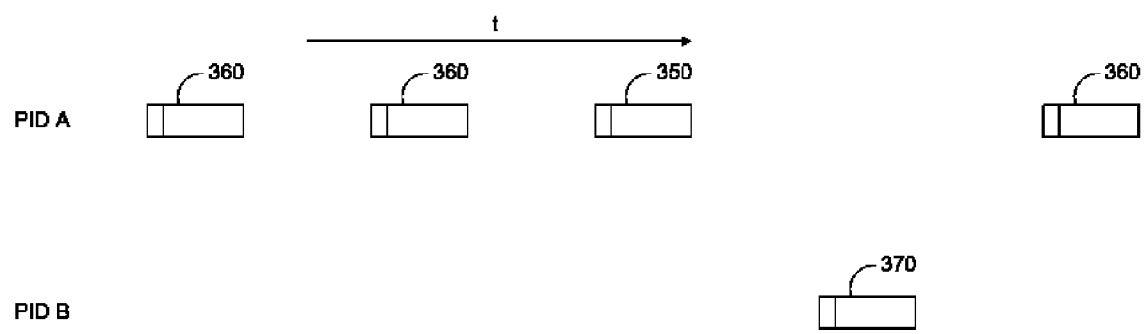
FIG. 3B illustrates two streams with different types of encryption.

The packets 350, 360, 370 of the elementary video stream $V_1$ are depicted in FIG. 3B relative to one another versus time. The packets having one PID value can be combined in entirety or in part with the packets having another PID value to create a single elementary stream having differing PID values. The packets 350, 360, 370 are broadcast across the network to the legacy and overlay set-top boxes. The packets 370 encrypted with encryption scheme B for the overlay set-top box are sent at a time corresponding to the same packets 350 encrypted with encryption scheme A. These packets can be sent in any order regardless of their PID. In order to view a program from the overlay set-top box, the set-top box must be able to process the packets encrypted with its encryption scheme as well as any packets that are in the clear, while the packets encrypted with a scheme which does not correspond with the set-top box are dropped.

Figure 4:
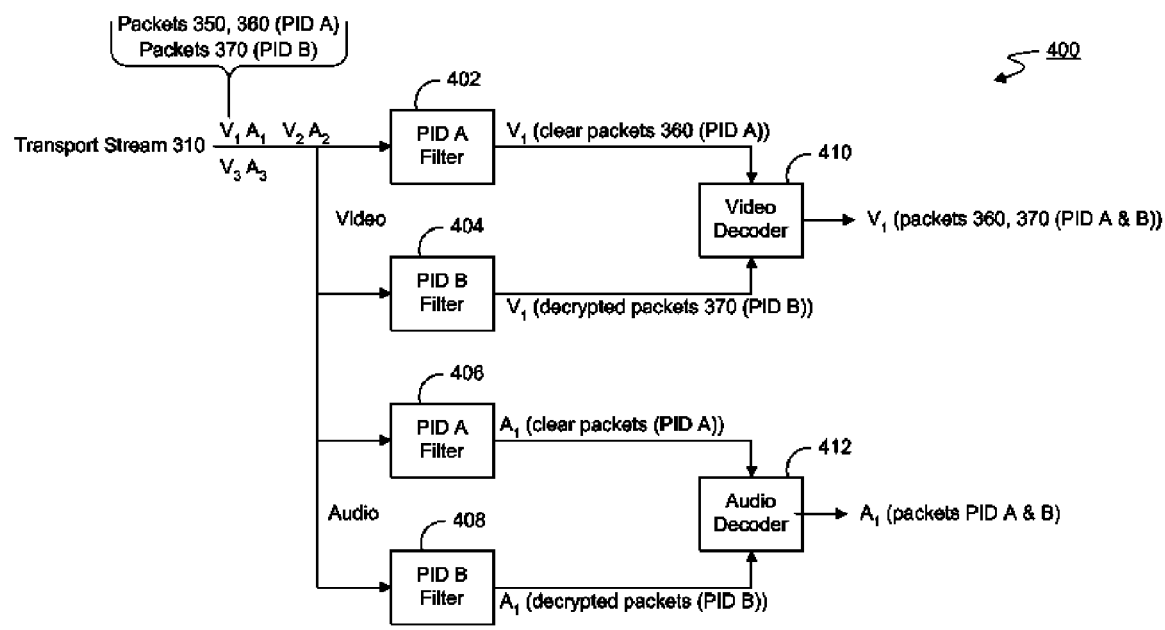
FIG. 4 illustrates one embodiment of a filter system of the present invention used to convert a transport stream to a video stream.

The present invention does not require PID remapping, but instead uses filters to process the encrypted material such as the elementary stream of video $V_1$ as described above. FIG. 4 illustrates one embodiment of a filter system 400 located in each overlay set-top box. A separate filter is needed for each PID value of a stream and is responsible for removing the transport packet header and adaptation field. At least some of the filters of the filter system include decryption technology. For example, dual filters 402, 404 are required for the stream of video $V_1$ and dual filters 406, 408 are required for the stream of audio $A_1$. The multiple program transport stream 310 feeds simultaneously into every filter, but the filters are assigned the PIDs of the desired portions of the video and audio streams. For example, if $V_1$ is the desired video stream, the packet filter 402 filters out and discards the packets 350 having PID A which are encrypted with incumbent encryption scheme A, while the clear packets 360 having PID A are allowed to pass through the filter 402. The packet filter 404 filters out everything except those packets 370 having PID B and encrypted with overlay encryption scheme B. The encrypted packets 370 having PID B are decrypted at filter 404. The clear packets 360 leaving packet filter 402 and the decrypted packets 350 leaving packet filter 404 then enter the video decoder 410, which extracts and decodes the video elementary stream carried within packets 340, 350 into proper video format of a single elementary stream for the overlay set-top box.

The same method occurs simultaneously for the corresponding audio stream using dual filters 406, 408. If the corresponding audio stream is $A_1$, the packet filter 406 filters out and discards the packets having PID A encrypted with incumbent encryption scheme A, while the clear packets having PID A are allowed to pass through the filter 406. The packet filter 408 filters out everything except those packets having PID B encrypted with overlay encryption scheme B. The encrypted stream B is decrypted at filter 408. The clear packets leaving packet filter 406 and the decrypted packets leaving packet filter 408 then enter the audio decoder 412, which extracts and decodes the audio elementary stream carried within the audio packets into proper audio format. The same method is followed for any other video and audio stream selected by a user utilizing an overlay set-top box.

Therefore, no longer is it required to apply a single PID value to all data in an elementary stream. As a result of the present invention, multiple PID values are used to carry one elementary stream. The dual filter system 400 filters out the packets encrypted according to the unwanted encryption scheme and then produces the desired packets, having different PID values, such as the packets encrypted according to the desired scheme and the packets in the clear, to a decoder which provides the desired packets and merges some or all of the desired packets to form a single elementary stream seen by the user.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A set-top box apparatus comprising:
   a first filter configured to receive a transport stream comprising packets having a first PID value of a first program, at least some packets having said first PID value being encrypted with a first encryption scheme, said first filter being configured to filter out said encrypted packets having said first PID value of said first program from said transport stream and to output unencrypted packets having said first PID value of said first program; and
   a second filter configured to receive a transport stream comprising packets having a second PID value of said first program, at least some packets having said second PID value for the first program being encrypted with a second encryption scheme, said second filter being configured to filter out packets other than said encrypted packets having said second PID value of said first program from said transport stream and to decrypt said encrypted packets having said second PID value of said first program without remapping PID values to output decrypted packets having said second PID value for said first program.

2. The set-top box apparatus of claim 1, and further comprising a first decoder coupled to the first filter and to the second filter, wherein the first decoder is configured to decode unencrypted packets having said first PID value and the decrypted packets having said second PID value to produce a first single elementary stream.

3. The set-top box apparatus of claim 1, and further comprising a third filter and a fourth filter each configured to receive the transport stream which further comprises packets for a second program having said first PID value, at least some packets for said second program having said first PID value being encrypted with the first encryption scheme and packets having said second PID value for the second program, at least some packets having said second PID value for the second program being encrypted with the second encryption scheme, wherein the third filter is configured to filter out said encrypted packets having said first PID value of said second program from said transport stream to output unencrypted packets having said first PID value for said second program, and the third filter is configured to filter out packets other than said encrypted packets having said second PID value of said second program from said transport stream and to decrypt said encrypted packets having said second PID value of said second program without remapping PID values in order to output decrypted packets having said second PID value for said second program wherein said packets.

4. The set-top box apparatus of claim 3, and further comprising a second decoder coupled to the third filter and fourth filter, wherein the second decoder is configured to decode the encrypted packets having said first PID value for said second program and to decode the decrypted packets having said second PID value for said second program to produce a second single elementary stream.

5. A method comprising:
   receiving a transport stream comprising packets having a first PID value of a first program, at least some packets having said first PID value being encrypted with a first encryption scheme, and packets having a second PID value of said first program, at least some packets having said second PID value for the first program being encrypted with a second encryption scheme;
   filtering out said encrypted packets having said first PID value of said first program from said transport stream to output unencrypted packets having said first PID value of said first program;
   filtering out packets other than said encrypted packets having said second PID value of said first program from said transport stream; and
   decrypting said encrypted packets having said second PID value of said first program without remapping PID values in order to output decrypted packets having said second PID value for said first program.

6. The method of claim 5, wherein receiving comprises receiving packets for a first elementary video stream.

7. The method of claim 5, wherein said filtering out said encrypted packets having said first PID value of said first program from said transport stream is performed with a first filter; and said filtering out packets other than said encrypted packets having said second PID value of said first program from said transport stream is performed with a second filter.

8. The method of claim 5, wherein said decrypting of said encrypted packets having said second PID value of said first program is performed with said second filter.

9. The method of claim 8, and further comprising decoding said unencrypted packets having said first PID value for the first program and the decrypted packets having said second PID value for the first program thereby producing a single elementary stream.

10. The method of claim 5, wherein receiving comprises the transport stream comprising packets for a second program having said first PID value, at least some packets for said second program having said first PID value being encrypted with the first encryption scheme and packets having said second PID value for the second program, at least some packets having said second PID value for the second program being encrypted with the second encryption scheme.

11. The method of claim 10, and further comprising:
    filtering out said encrypted packets having said first PID value of said second program from said transport stream to output unencrypted packets having said first PID value for said second program;
    filtering out packets other than said encrypted packets having said second PID value of said second program from said transport stream; and
    decrypting said encrypted packets having said second PID value of said second program without remapping PID values to output decrypted packets having said second PID value for said second program.

12. The method of claim 11, wherein the packets having the first PID value for the first program and the packets the second PID value for the first program are video packets.

13. The method of claim 12, wherein the packets having the first PID value for the second program and the packets having the second PID value for the second program are audio packets.

14. The method of claim 5, wherein the packets having the first PID value for the second program and the packets having the second PID value for the second program are video packets.

* * * * *